United States Patent
Srinivasan et al.

(10) Patent No.: US 9,519,570 B2
(45) Date of Patent: Dec. 13, 2016

(54) PROGRESSIVE SNAPSHOTS IN AUTOMATED SOFTWARE TESTING

(71) Applicant: International Business Machines Corporation, Armonk, NY (US)

(72) Inventors: Balaji Srinivasan, Chennai (IN); Madhu Tadiparthi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 14/219,050

(22) Filed: Mar. 19, 2014

(65) Prior Publication Data
US 2015/0269059 A1 Sep. 24, 2015

(51) Int. Cl.
*G06F 11/36* (2006.01)
(52) U.S. Cl.
CPC ................ *G06F 11/3664* (2013.01)
(58) Field of Classification Search
CPC .............. G06F 11/36; G06F 3/0484
See application file for complete search history.

(56) References Cited

U.S. PATENT DOCUMENTS

| | | | | |
|---|---|---|---|---|
| 6,473,894 B1* | 10/2002 | Shrader | ............... | G06F 11/3672 707/E17.116 |
| 7,296,184 B2 | 11/2007 | Derks et al. | | |
| 7,600,219 B2 | 10/2009 | Tsantilis | | |
| 2006/0129584 A1* | 6/2006 | Hoang | ................... | G06F 9/542 |
| 2007/0061641 A1* | 3/2007 | Yoon | ..................... | H04L 41/145 714/724 |
| 2008/0079961 A1* | 4/2008 | Borodin | .............. | G06F 11/3684 358/1.9 |
| 2008/0148235 A1* | 6/2008 | Foresti | ................ | G06F 11/3612 717/123 |
| 2008/0310736 A1* | 12/2008 | Chattopadhyay | ... | G06F 11/3692 382/218 |
| 2010/0318933 A1 | 12/2010 | McMahan et al. | | |
| 2011/0314343 A1 | 12/2011 | Hoke et al. | | |

(Continued)

OTHER PUBLICATIONS

IBM, "An animation logs for GUI automation test", An IP.com Prior Art Database Technical Disclosure, Original Publication Date: Dec. 7, 2008, IP.com No. IPCOM000177245D, IP.com Electronic Publication: Dec. 7, 2008, <http://ip.com/IPCOM/000177245>.

(Continued)

*Primary Examiner* — David Choi
(74) *Attorney, Agent, or Firm* — Alexa L. Ashworth; Derrick J. Carman (57) ABSTRACT

Embodiments of the present invention disclose a method, computer program product, and system for recording and displaying graphical user interface snapshots during automated testing. A computer captures a first snapshot of a complete graphical user interface, wherein the graphical user interface has at least one graphical user interface control. The computer determines a location of the at least one graphical user interface control. The computer determines that a first test step has altered the at least one graphical user interface control. The computer captures a second snapshot of the altered graphical user interface control. The computer stores the second snapshot and the location of the graphical user interface control in association with the test step.

20 Claims, 6 Drawing Sheets

(56) References Cited

U.S. PATENT DOCUMENTS

| | | | |
|---|---|---|---|
| 2013/0085741 A1* | 4/2013 | Segall | G06F 11/3676 703/21 |
| 2013/0148129 A1* | 6/2013 | Warden | G01B 9/02004 356/498 |
| 2013/0246950 A1* | 9/2013 | Freestone | G06F 17/3089 715/765 |
| 2014/0075371 A1* | 3/2014 | Carmi | G06F 11/3438 715/781 |
| 2015/0160944 A1* | 6/2015 | Bank | G06F 8/77 717/101 |
| 2015/0269059 A1* | 9/2015 | Srinivasan | G06F 11/3664 714/38.1 |

OTHER PUBLICATIONS

"Use ScreenCapture/Compare Automation in UI regression", An IP.com Prior Art Database Technical Disclosure, Authors et. al.: Disclosed Anonymously, IP.com No. IPCOM000200605D, IP.com Electronic Publication: Oct. 20, 2010, pp. 1-4, <http://ip.com/IPCOM/000200605>.

* cited by examiner

PROGRESSIVE SNAPSHOTS IN AUTOMATED SOFTWARE TESTING

FIELD OF THE INVENTION

The present invention relates generally to the field of automated software testing and more particularly to snapshot recording and rendering.

BACKGROUND OF THE INVENTION

Automated testing in software is the use of special software, apart from that being tested, that controls the execution of a predefined set of test steps and compares the actual outcomes of those steps with predicted outcomes. Traditional automated testing tools capture snapshots of the complete graphical user interface (GUI) following each automated test step in order to render a pictorial representation of the progression of the GUI through the test sequence.

Automated testing of graphical user interfaces relies on a set of detailed instructions which simulate a series of interactions between a user and the application under test. The instructions include events such as mouse movements, mouse clicks, focus change events, and keyboard strokes. Additional events are possible on devices, such as cell phones or tablet computers, which include multi-touch displays. Each event has a pre-event and a post-event, which can be detected by application code tools known as listeners. Listeners are small programs that are triggered when specific events take place.

SUMMARY

Embodiments of the present invention disclose a method, computer program product, and system for recording and displaying graphical user interface snapshots during automated testing. A computer captures a first snapshot of a complete graphical user interface, wherein the graphical user interface has at least one graphical user interface control. The computer determines a location of the at least one graphical user interface control. The computer determines that a first test step has altered the at least one graphical user interface control. The computer captures a second snapshot of the altered graphical user interface control. The computer stores the second snapshot and the location of the graphical user interface control in association with the test step.

DETAILED DESCRIPTION

Embodiments of the present invention recognize that capturing a complete snapshot of the entire GUI associated with each test step increases the storage size and processing time of test results and can increase the network overhead associated with performing the automated test. The increase in processing time and network overhead slows down the automated testing process and prevents the testing tool from providing a real-time experience with the application under test.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
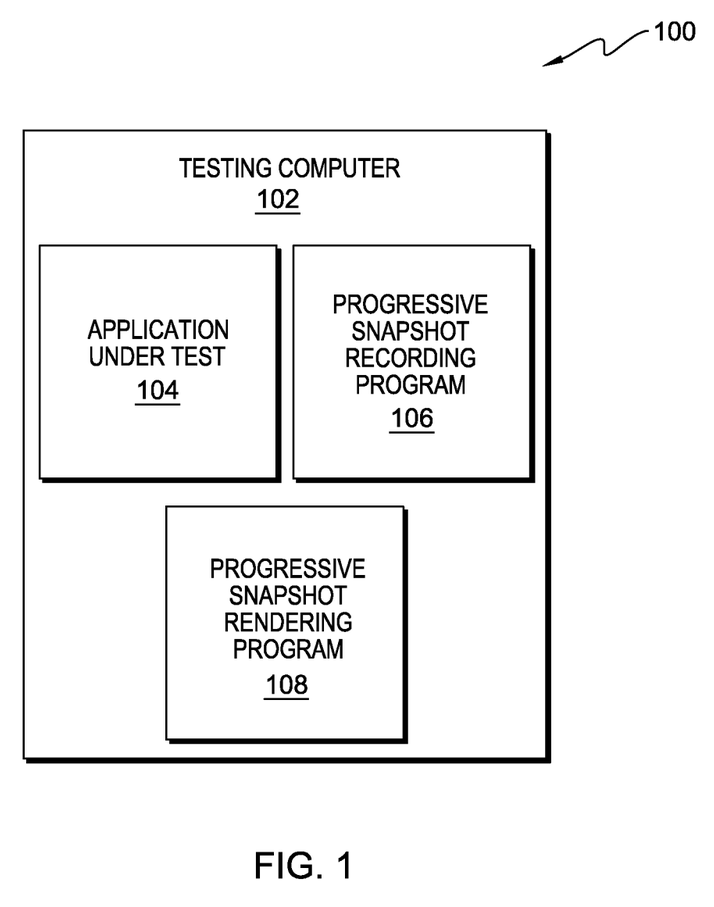
FIG. 1 is a functional block diagram illustrating an automated testing environment, in accordance with an embodiment of the present invention.

The present invention will now be described in detail with reference to the Figures. FIG. 1 is a functional block diagram illustrating an automated testing environment, generally designated 100, in accordance with one embodiment of the present invention.

Automated testing environment 100 includes testing computer 102. In various embodiments of the present invention, testing computer 102 can be a server, laptop computer, a tablet computer, a notebook computer, a personal computer (PC), a desktop computer, a personal digital assistant (PDA), a smart phone, or any programmable electronic device capable of executing progressive snapshot recording program 106, progressive snapshot rendering program 108, and application under test 104. In another embodiment, testing computer 102 represents a computing system utilizing clustered computers and components to act as a single pool of seamless resources. Testing computer 102 includes application under test 104, progressive snapshot recording program 106, and progressive snapshot rendering program 108. Testing computer 102 may include internal and external hardware components, as depicted and described in further detail with respect to FIG. 5.

In another embodiment, application under test 104 is stored on an external computing system, such as a smart phone or tablet computer. Progressive snapshot recording program 106 and progressive snapshot rendering program 108 are stored on a testing computer that is connected to the external computing system on which application under test 104 is stored via a network. In various embodiments, the network can be, for example, a local area network (LAN), a wide area network (WAN) such as the Internet, or a combination of the two, and may include wired, wireless, fiber optic, or any other connection known in the art. In general, the network can be any combination of connections and protocols that will support communications between the external computing system on which application under test 104 is stored and the testing computer on which progressive snapshot recording program 106 and progressive snapshot rendering program 108 are stored.

Application under test 104 is an application that is subjected to automated testing by testing computer 102. In one embodiment, application under test 104 is a computer program that has a GUI through which a user or computer can interact with the application. Application under test 104 is capable of being tested using automated testing techniques. During the automated testing, the GUI of application under test 104 undergoes changes as a testing tool interacts with application under test 104. For example, the GUI of application under test may include a login screen. As the automated testing tool interacts with the login screen GUI, the GUI will change (e.g., highlight a "username" object, display a series of keyboard strokes in an input box, etc.).

Progressive snapshot recording program 106 is part of a larger automated testing tool program that runs application under test 104 and captures snapshots of the object being modified for a particular step in the automated test. Progressive snapshot recording program 106 records a snapshot of the initial state of the GUI. Following each automated test step, progressive snapshot recording program 106 locates and records a snapshot of only the GUI object or control that is affected by the step. Progressive snapshot recording program 106 associates the snapshot and the location of the control with the automated test step.

Progressive snapshot rendering program 108 is part of the larger automated testing tool program and provides a sequential display of the snapshots associated with the steps of a recorded automated test. Progressive snapshot rendering program initially displays the complete GUI image/snapshot associated with the initial automated test step. For each sequential step, progressive snapshot rendering program 108 overlays the snapshot of the control affected by the given step at the location where that snapshot was taken by progressive snapshot recording program 106.

Figure 2:
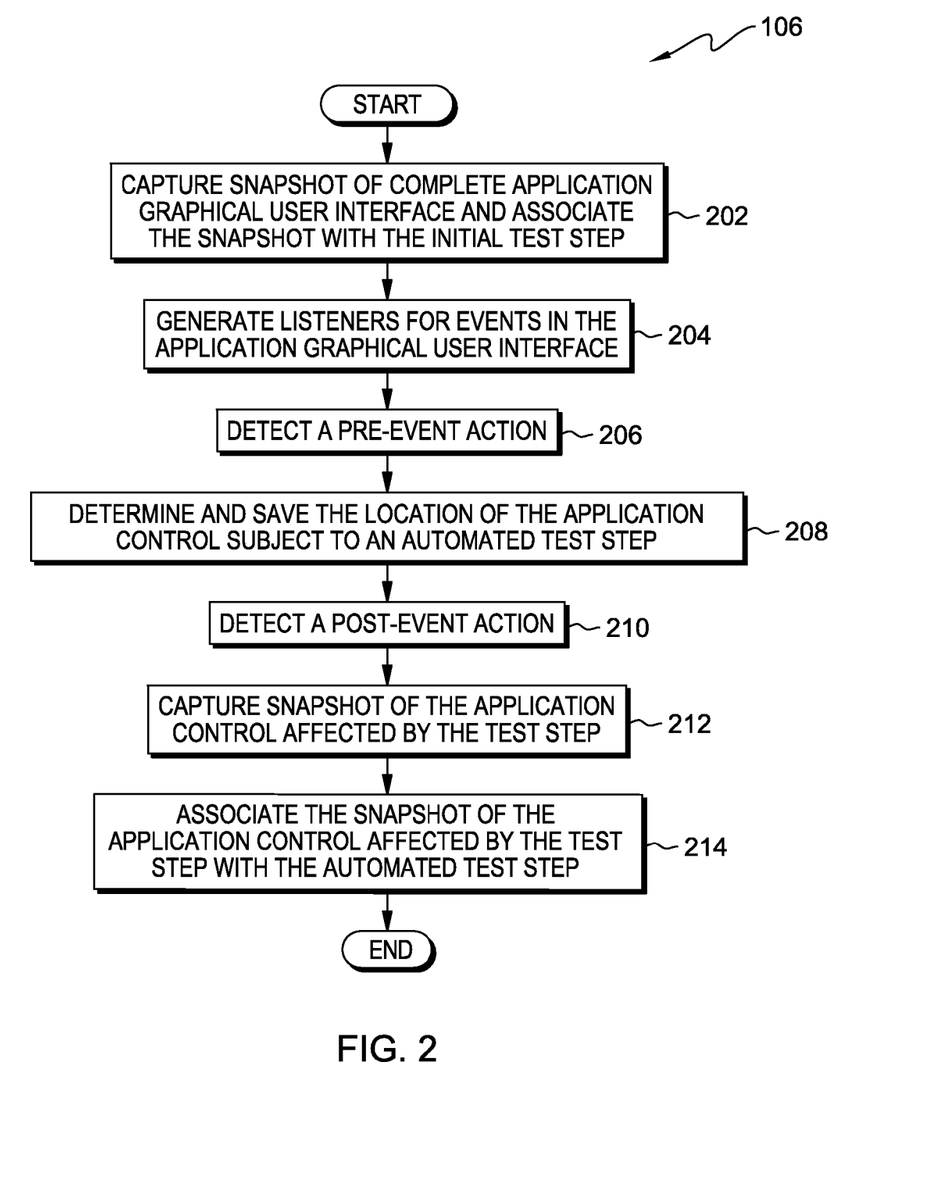
FIG. 2 is a flowchart depicting operational steps of a progressive snapshot recording program, on testing computer 102 within the automated testing environment of FIG. 1, in accordance with an embodiment of the present invention.

FIG. 2 is a flowchart depicting operational steps of progressive snapshot recording program 106, in accordance with an embodiment of the present invention. Initially, progressive snapshot recording program 106 receives a series of actions from a user to create steps for the automated test. One skilled in the art will appreciate that automated test steps can be prerecorded in an automated testing tool to be performed on application under test 104 at a later time. The series of automated test steps can be, for example, a series of mouse clicks, keystrokes, or screen taps (as for a touch screen).

Progressive snapshot recording program 106 captures a snapshot of the complete application graphical user interface and associates the snapshot with the initial test step (step 202). In one embodiment, the snapshot includes a complete screen capture of the initial setup of the GUI for application under test 104. For example, the snapshot includes a whole login screen, including any graphics or objects that are displayed as part of application under test 104, but cannot be interacted with by the user. Progressive snapshot recording program 106 associates the snapshot with the initial test step. For example, progressive snapshot recording program 106 saves the initial image as an image file (e.g., .jpeg, .png, .bmp) and stores the file as metadata that is connected with the initial test step.

Progressive snapshot recording program 106 generates listeners for events in the application graphical user interface (step 204). Listeners are small, predetermined programs that instruct the automated testing tool how to react when certain events take place. Listeners are associated with specific events and in the case of a GUI, particular buttons, menus, and other controls that can be interacted with by a user. When a user clicks on a control that has associated listeners, the control sends an "action performed" message to all of the listeners that are associated with the control. When the listener receives the "action performed" message, the listener will execute a section of program code which results in changes in the program, such as a displaying a new GUI, performing calculations, sending credentials for verification, etc. Examples of common listeners include focus change listeners (when a different GUI control receives the focus of the keyboard), down click events (when a user depresses the mouse button), and up click events (when a user releases an already depressed mouse button). In one embodiment, the user specifies to progressive snapshot recording program 106 which listeners should be included for a given automated test. In another embodiment, predetermined combinations of listeners can be used for common sets of events.

Progressive snapshot recording program 106 detects a pre-event action (step 206). For each event, there are pre-event actions and post-event actions. For example, where a button is clicked (e.g., up click with a mouse, releasing a key on the keyboard, or removing a finger from a touch screen), there must first be an event where the button is pressed (e.g., down clicking a mouse button, pressing a key on the keyboard, or placing a finger on a touch screen), and then an event where the button is released. A listener detects the pre-event action as part of an automated test step. For example, progressive snapshot recording program 106, which has registered listeners for mouse clicks, detects an event that is associated with a mouse click as the pre-event action for the click, such as a mouse cursor hovering over a particular GUI control for a particular period of time. In one embodiment, the listener detects that a pre-event action has taken place and the location of that action.

Progressive snapshot recording program 106 determines and saves the location and geometry of the application control subject to the automated test step (step 208). When a listener is triggered by detection of a pre-event action, the listener includes information in how progressive snapshot recording program 106 proceeds. In one embodiment, the listener that detects the pre-event action (e.g., a down click) includes instructions to detect the control which is being interacted with by the pre-event action. The listener instructs progressive snapshot recording program 106 to determine the location of the control on the GUI (i.e., the x and y coordinates of the control in the GUI) and the geometry of the control (e.g., the height and width of the control). Progressive snapshot recording program 106 saves the location and geometry information by associating the coordinates and geometric dimensions with the automated test step that generated the pre-event action. In one embodiment, the location and geometry of the control is stored in metadata associated with the test step that triggered the pre-event action.

Progressive snapshot recording program 106 detects a post-event action (step 210). In one embodiment, a listener detects that a post-event action occurred in the automated test step. For example, a mouse click was released, resulting in an up click. Listeners detect post-event actions in the same manner as pre-event actions. In one embodiment, the post-event action is the action which concludes a particular automated test step. For example, a single automated test step includes both a down click and an up click of the mouse. The down click triggers the pre-event action, but the test step does not conclude until after the up click, or post-event action occurs.

Progressive snapshot recording program 106 captures a snapshot of the application control affected by the test step (step 212). Using the location and geometric information of the GUI control that was detected and saved in step 208, progressive snapshot recording program 106 captures a snapshot of only the control that was the subject of interaction by the test step. For example, in a GUI where a given button is designed to change color when it is clicked, when progressive snapshot recording program 106 detects a down click it determines the location and geometry of the button, and then when progressive snapshot recording program 106 detects the up click, it captures a snapshot of that location and geometry.

Progressive snapshot recording program 106 associates the snapshot of the application control affected by the test step with the automated test step (step 214). In one embodiment, progressive snapshot recording program 106 saves the snapshot as an image file (e.g., .jpeg, .png, .bmp) and saves the image file with the metadata associated with the automated test step, which also includes the location and geometry of the control affected by that step.

Figure 3:
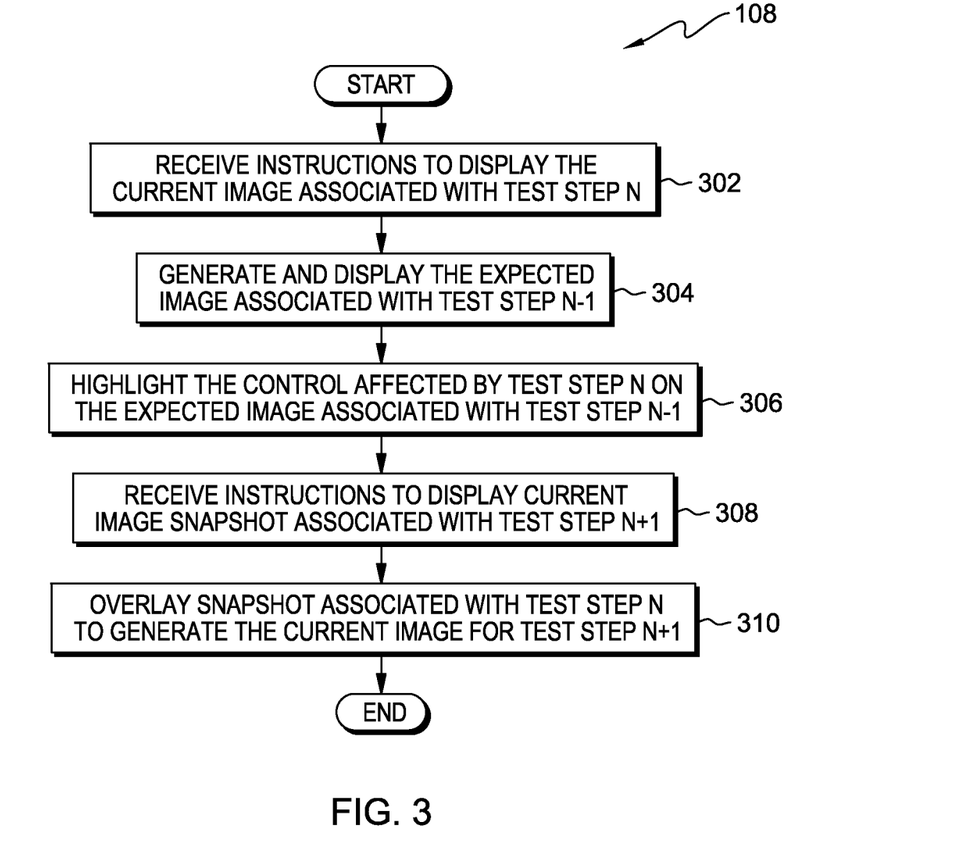
FIG. 3 illustrates operational steps of a progressive snapshot rendering program, on testing computer 102 within the automated testing environment of FIG. 1, in accordance with an embodiment of the present invention.

FIG. 3 illustrates operational steps of progressive snapshot rendering program 108, on testing computer 102 within the automated testing environment of FIG. 1, in accordance with an embodiment of the present invention. Progressive snapshot rendering program 108 displays the images recorded by progressive snapshot recording program 106 in a sequential manner.

Progressive snapshot rendering program 108 receives instructions to display the current image associated with test step N (where N is an integer) (step 302). The instruction can be received from a user using an automated testing tool that has conducted an automated test and is now reviewing the results of the automated test. Progressive snapshot rendering program 108 generates a current image and an expected image for each automated test step for which it recorded a snapshot with progressive snapshot recording program 106. Each step has a current image, which is the image of the GUI as it appeared during the pre-event stage of progressive snapshot recording program 106. For example, for the initial automated test step, the current image is the complete image of the GUI that was captured in step 202 of progressive snapshot recording program 106.

Progressive snapshot rendering program 108 generates and displays the expected image associated with test step N−1 (step 304). The expected image for a given test step includes the initial GUI snapshot (i.e., the snapshot of the complete GUI as it appeared in test step 1) with the snapshot for each subsequent step up to step N−1 displayed over the initial GUI snapshot at the location of the control effected by each step. For example, the current image of step 1 is the complete GUI snapshot. The expected image for step 1 is the complete GUI snapshot (the current image of step 1) with the snapshot of the control effected by step 1 displayed over top of the current image of step 1 at the location of the control interacted with by the automated test in step 1. The expected image for step 1 is also the current image for step 2. The expected image for step 2 is also the current image for step 3, etc.

Progressive snapshot rendering program 108 highlights the control affected by test step N on the expected image associated with test step N−1 (step 306). In one embodiment, progressive snapshot rendering program 108 indicates which control is subject to modification in step N to the user by highlighting the control on a display, such as an LCD or a CRT screen. The highlighted control is the control that will appear changed when the user decides to display the expected image for step N (which is also the current image for step N+1).

Progressive snapshot rendering program 108 receives instructions to display the current image snapshot associated with test step N+1 (step 308). Progressive snapshot rendering program 108 receives the instructions to advance the display by one step from a user through the graphical user interface of the automated testing tool.

Progressive snapshot rendering program 108 overlays the snapshot associated with test step N to generate the current image for test step N+1 (step 310). In one embodiment, progressive snapshot rendering program 108 locates the image file that contains the snapshot stored as part of the metadata associated with test step N. Progressive snapshot rendering program 108 locates the location information that is stored as part of the metadata associated with test step N. Progressive snapshot rendering program 108 then overlays the image file associated with test step N at the location of the image associated with the test step metadata. The resulting image is the current image for test step N with the snapshot overlaid at the location of the control that was modified in test step N. The resulting image is also the expected image for test step N and the current image for test step N+1.

Figure 4A:
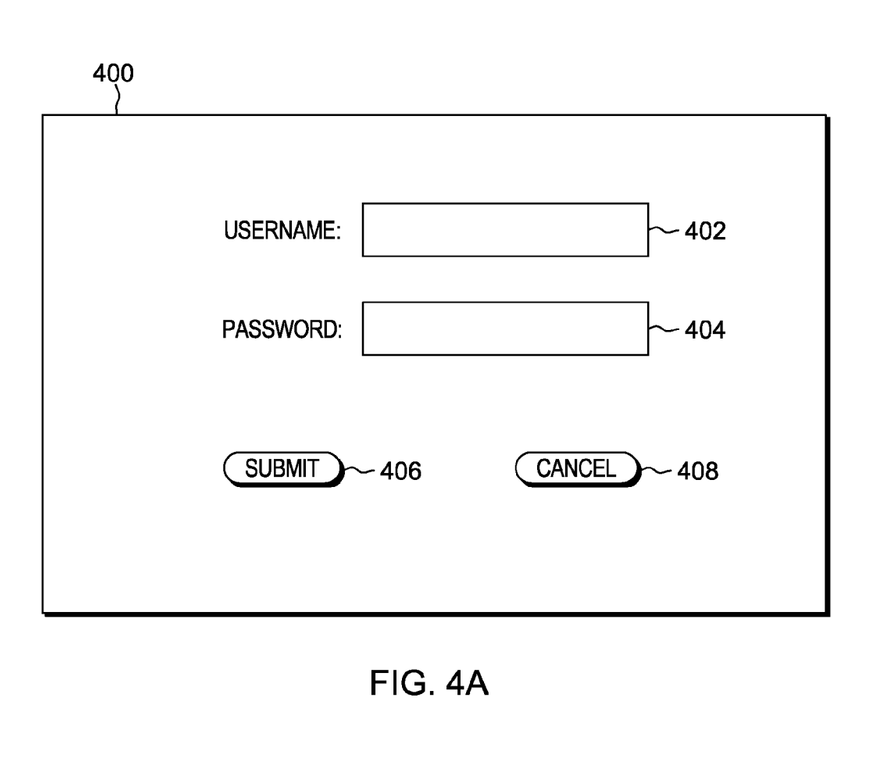
FIG. 4A is a functional block diagram illustrating a graphical user interface snapshot, in accordance with an embodiment of the present invention.
Figure 4B:
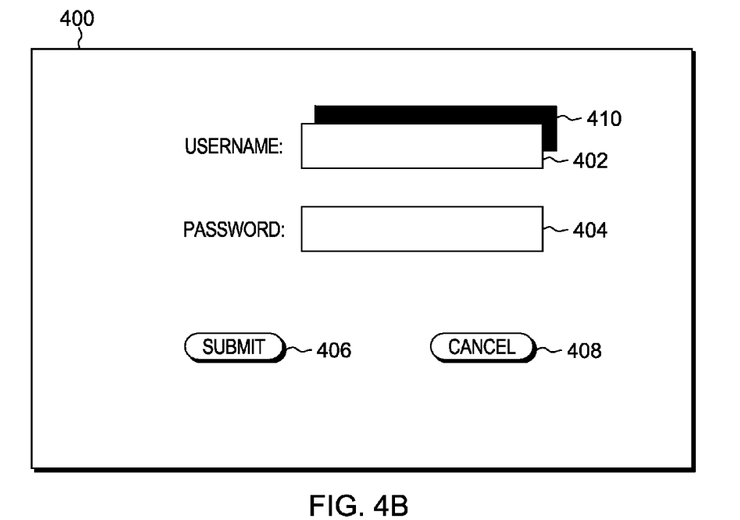
FIG. 4B is a functional block diagram illustrating a graphical user interface with a highlighted control, in accordance with an embodiment of the present invention.
Figure 4C:
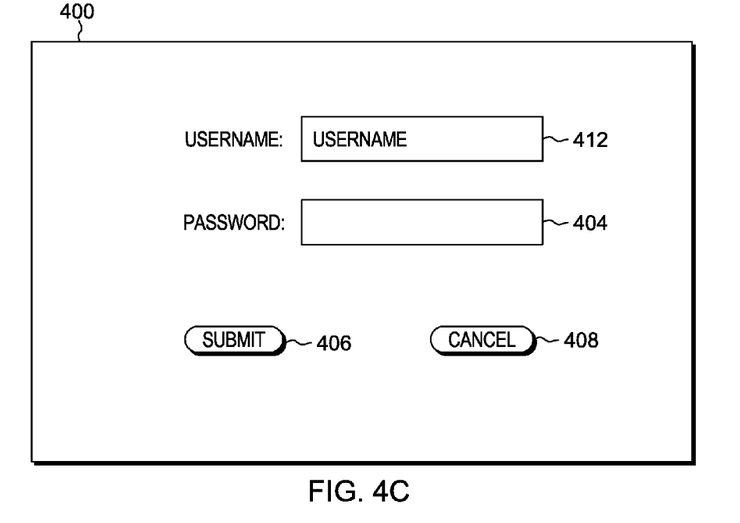
FIG. 4C is a functional block diagram illustrating a snapshot of a graphical user interface with a second snapshot displayed over a portion of the snapshot of the graphical user interface, in accordance with an embodiment of the present invention.

FIGS. 4A, 4B, and 4C depict a progression of screenshots that are displayed in the execution of progressive snapshot rendering program 108.

FIG. 4A is a functional block diagram illustrating a graphical user interface snapshot, generally designated 400, in accordance with an embodiment of the present invention. Initially, an automated testing tool, such as testing computer 102 executes progressive snapshot recording program 106. In the depicted embodiment, progressive snapshot recording program 106 recorded an initial snapshot of the complete graphical user interface. Progressive snapshot recording program 106 also recorded a snapshot of a username input box, which is the GUI control that the automated test interacted with during the recording of the automated test steps.

FIG. 4A depicts graphical user interface snapshot 400, which includes username input box 402, password input box 404, submit button 406, and cancel button 408. Username input box and 402 and password input box 404 represent text entry controls in a GUI that a user can interact with, for example, by clicking a mouse, typing on a keyboard, or tapping a touch screen. Graphical user interface snapshot 400 is a snapshot of the initial state of the graphical user interface in application under test 104. Progressive snapshot rendering program 108 displays graphical user interface 400 to a user when instructed to display the current image associated with the initial test step of an automated test.

FIG. 4B is a functional block diagram illustrating a graphical user interface with a highlighted control, in accordance with an embodiment of the present invention.

A user instructs progressive snapshot rendering program 108 to display the next step associated with the automated test by, for example, selecting a button in the graphical user interface of progressive snapshot rendering program 108. Alternatively, the instruction may be received by pressing an arrow key on a keyboard connected to the computer executing progressive snapshot rendering program 108. In response to receiving the instruction to display the next automated test step, progressive snapshot rendering program 108 determines the location and geometry and location of the control that is modified by the next test step and highlights the control that is modified in the next step in order to indicate to the user which control is being modified by the automated test step.

FIG. 4B depicts graphical user interface snapshot 400 with username input box 402 highlighted with shadowing effect 410. The location of the control being modified by the subsequent test step can be indicated in any manner that draws the user's attention to the control. For example, the control may include a colorful border, a three-dimensional effect (as in FIG. 4B), or any other alteration to graphical user interface snapshot 400 designed to draw the user's attention to the specific location and/or geometry of the control subject to modification by the automated test step.

FIG. 4C is a functional block diagram illustrating a snapshot of a graphical user interface with a second snapshot displayed over a portion of the snapshot of the graphical user interface, in accordance with an embodiment of the present invention.

Initially, a user provides an instruction to progressive snapshot program 108 to display the expected image of the currently displayed test step (which is also the current image of the immediately subsequent test step). Progressive snapshot rendering program 108 overlays the snapshot associated with the test step that immediately follows the currently displayed snapshot. For example, FIG. 4C depicts graphical user interface snapshot 400 with an altered username input box snapshot 412 displayed in place of username input box 402. In this example, during recording, the progressive snapshot recording program 106 determined the location and geometry of username input box 402 after detecting an event, such as keyboard strokes, modifying username input box 402. Progressive snapshot recording program 106 captured a snapshot of only the location and geometry of username input box 402 after the event concluded. The captured snapshot is an image file depicting altered username input box 412. After receiving instructions to display the expected image associated with the first automated test step, progressive snapshot rendering program 108 displays altered username input box 412 at the same location that it previously determined username input box 402 to be located at. The resulting display to the user is graphical user interface snapshot 400 with altered username input box 412 displayed overtop of username input box 402 so that the user cannot see username input box 402.

Figure 5:
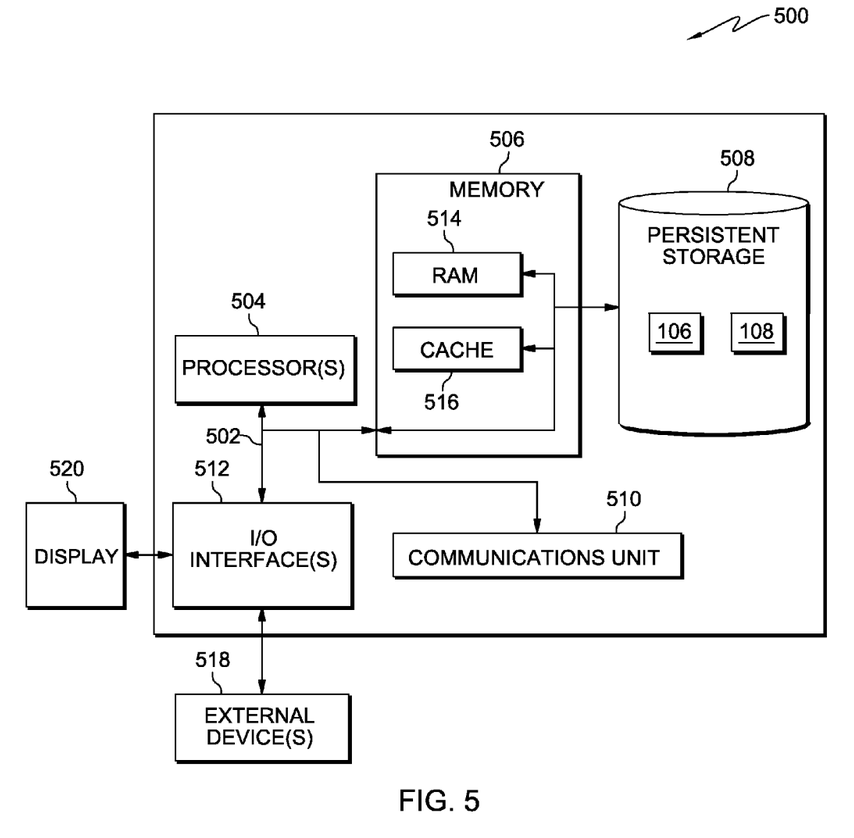
FIG. 5 depicts a block diagram of components of the testing computer executing the progressive snapshot recording program and the progressive snapshot rendering program, in accordance with an embodiment of the present invention.

FIG. 5 depicts a block diagram of components of testing computer 102 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Progressive snapshot recording program 106 and progressive snapshot rendering program 108 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including testing computer 102. In these examples, communications unit 510 includes one or more network interface cards. Communications unit 510 may provide communications through the use of either or both physical and wireless communications links. Progressive snapshot recording program 106 and progressive snapshot rendering program 108 may be downloaded to persistent storage 508 through communications unit 510.

I/O interface(s) 512 allows for input and output of data with other devices that may be connected to testing computer 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., progressive snapshot recording program 106 and progressive snapshot rendering program 108, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for progressive snapshot generation in automated testing, the method comprising:
   capturing, by one or more computer processors, a first snapshot of a complete graphical user interface, wherein the graphical user interface has at least one graphical user interface control;

determining, by one or more computer processors, a location of the at least one graphical user interface control;

determining, by one or more computer processors, that a first test step has altered the at least one graphical user interface control;

capturing, by one or more computer processors, a second snapshot of only a graphical user interface control modified by the first test step;

associating the captured second snapshot of only the graphical user interface control with a test step N, where N is an integer;

storing, by one or more computer processors, the second snapshot and the location of the graphical user interface control in association with the test step, wherein a rendering program generates a current image and an expected image for each recorded test step, wherein the expected image for each recorded test step comprises the first snapshot of the complete graphical user interface and a snapshot for each subsequent test step N, up to N−1, displayed over the first snapshot of the complete graphical user interface at the location of the graphical user interface control effected by each test step; and displaying, via the rendering program, a highlighted GUI control of the test step N, wherein the highlighted GUI control of the test step N comprises only the GUI control modified by the first test step overlaying the graphical user interface control at the location of the graphical user interface control, such that a user sees only the GUI control modified by the first test step.

2. The method of claim 1, further comprising:
receiving, by the rendering program, an instruction to advance a display of the complete graphical user interface by one step;
displaying, by one or more computer processors, the first snapshot of the complete graphical user interface; and
overlaying, by one or more computer processors, the second snapshot over the first snapshot at the determined location of the at least one graphical user interface control, in order to generate a current image for the subsequent test step, N+1.

3. The method of claim 2, further comprising:
indicating on the display of the first snapshot, the determined location of the at least one graphical user interface control.

4. The method of claim 1, wherein determining the information detailing the location and geometry of the at least one graphical user interface comprises:
generating, by one or more computer processors, an event listener, wherein the event listener receives an event message when a pre-event action occurs;
in response to receiving an event message, detecting, by the event listener, the at least one graphical user interface control which is being interacted with by the pre-event action; and
determining, by one or more computer processors, the location of the at least one graphical user interface control based at least in part on application code associated with the graphical user interface.

5. The method of claim 1, further comprising:
determining, by one or more computer processors, that a second test step instructs the graphical user interface to reload the complete graphical user interface;

capturing, by one or more computer processors, a third snapshot, wherein the third snapshot is of the complete graphical user interface;

associating, by one or more computer processors, the third snapshot with the second test step; and overlaying, by one or more computer processors, the third snapshot over the second snapshot at the determined location of the at least one graphical user interface control within the complete graphical user interface, wherein the resulting image is the expected image for a second test step N, and the current image for a third test step, N+1, where N is equal to 2.

6. The method of claim 1, wherein the test step comprises detecting a pre-event action, wherein the pre-event action comprises an event which occurs directly prior to the alteration of the at least one graphical user interface control; and detecting a post-event action, wherein the post-event action comprises a second event which occurs directly after the alteration to the at least one graphical user interface control and concludes the test step, and wherein an event listener detects the pre-event action and the post-event action, and wherein the pre-event action comprises at least one of: down clicking a mouse button, pressing a key on a keyboard, and placing a finger on a touch screen, and the post-event action comprises at least one of: up clicking a mouse button, releasing a key on a keyboard, and removing a finger from a touch screen.

7. The method of claim 1, wherein the second snapshot is stored in association with metadata, and wherein the information detailing the location and geometry of the graphical user interface are stored in the associated metadata.

8. A computer program product for optimizing fields in object oriented programming, the computer program product comprising:
one or more computer readable storage media and program instructions stored on the one or more computer readable storage media, the program instructions comprising:
program instructions to capture a first snapshot of a complete graphical user interface, wherein the graphical user interface has at least one graphical user interface control;
program instructions to determine a location of the at least one graphical user interface control;
program instructions to determine that a first test step has altered the at least one graphical user interface control;
program instructions to capture a second snapshot of only a graphical user interface control modified by the first test step;
program instructions to associate the captured second snapshot of only the graphical user interface control with a test step N, where N is an integer;
program instructions to store the second snapshot and the location of the graphical user interface control in association with the test step, wherein a rendering program generates a current image and an expected image for each recorded test step, wherein the expected image for each recorded test step comprises the first snapshot of the complete graphical user interface and a snapshot for each subsequent test step N, up to N−1, displayed over the first snapshot of the complete graphical user interface at the location of the graphical user interface control effected by each test step; and
program instructions to display, via the rendering program, a highlighted GUI control of the test step N, wherein the highlighted GUI control of the test step N comprises only the GUI control modified by the first test step overlaying the graphical user interface control at the location of the graphical user interface control, such that a user sees only the GUI control modified by the first test step.

9. The computer program product of claim 8, further comprising:
program instructions to receive, by the rendering program, an instruction to advance a display of the complete graphical user interface by one step;
program instructions, stored on the one or more computer readable storage media, to display the first snapshot of the complete graphical user interface; and
program instructions, stored on the one or more computer readable storage media, to overlay the second snapshot over the first snapshot at the determined location, in order to generate a current image for the subsequent test step, N+1.

10. The computer program product of claim 9, further comprising:
program instructions, stored on the one or more computer readable storage media, to indicate on the display of the first snapshot, the determined location.

11. The computer program product of claim 8, wherein the program instructions to determine the information detailing the location and geometry of the at least one graphical user interface comprises:
program instructions to generate an event listener, wherein the event listener receives an event message when a pre-event action occurs;
program instructions to, in response to receiving an event message, detect, by the event listener, the at least one graphical user interface control which is being interacted with by the pre-event action; and
program instructions to determine the location of the at least one graphical user interface control based at least in part on application code associated with the graphical user interface.

12. The computer program product of claim 8, further comprising:
program instructions, stored on the one or more computer readable storage media, to determine that a second test step instructs the graphical user interface to reload the complete graphical user interface;
program instructions, stored on the one or more computer readable storage media, to capture a third snapshot, wherein the third snapshot is of the complete graphical user interface;
program instructions, stored on the one or more computer readable storage media, to associate, by one or more computer processors, the third snapshot with the second test step; and
program instructions, stored on the one or more computer readable storage media, to overlay the third snapshot over the second snapshot at the determined location of the at least one graphical user interface control within the complete graphical user interface, wherein the resulting image is the expected image for a second test step N, and the current image for a third test step, N+1, where N is equal to 2.

13. The computer program product of claim 8, wherein the test step comprises detecting a pre-event action, wherein the pre-event action comprises an event which occurs directly prior to the alteration of the at least one graphical user interface control; and detecting a post-event action, wherein the post-event action comprises a second event which occurs directly after the alteration to the at least one graphical user interface control and concludes the test step, and wherein an event listener detects the pre-event action and the post-event action, and wherein the pre-event action comprises at least one of: down clicking a mouse button, pressing a key on a keyboard, and placing a finger on a touch screen, and the post-event action comprises at least one of: up clicking a mouse button, releasing a key on a keyboard, and removing a finger from a touch screen.

14. The computer program product of claim of claim 8, wherein the second snapshot is stored in association with metadata, and wherein the information detailing the location and geometry of the graphical user interface are stored in the associated metadata.

15. A computer system for optimizing fields in object oriented programming, the computer system comprising:
one or more computer processors;
one or more computer readable storage media;
program instructions stored on the computer readable storage media for execution by at least one of the one or more processors, the program instructions comprising:
program instructions to capture a first snapshot of a complete graphical user interface, wherein the graphical user interface has at least one graphical user interface control;
program instructions to determine a location of the at least one graphical user interface control;
program instructions to determine that a first test step has altered the at least one graphical user interface control;
program instructions to capture a second snapshot of only a graphical user interface control modified by the first test step;
program instructions to associate the captured second snapshot of only the graphical user interface control with a test step N, where N is an integer;
program instructions to store the second snapshot and the location of the graphical user interface control in association with the test step, wherein a rendering program generates a current image and an expected image for each recorded test step, wherein the expected image for each recorded test step comprises the first snapshot of the complete graphical user interface and a snapshot for each subsequent test step N, up to N−1, displayed over the first snapshot of the complete graphical user interface at the location of the graphical user interface control effected by each test step; and
program instructions to display, via the rendering program, a highlighted GUI control of the test step N, wherein the highlighted GUI control of the test step N comprises only the GUI control modified by the first test step overlaying the graphical user interface control at the location of the graphical user interface control, such that a user sees only the GUI control modified by the first test step.

16. The computer system of claim 15, further comprising:
program instructions to receive, by the rendering program, an instruction to advance a display of the complete graphical user interface by one step;
program instructions, stored on the one or more computer readable storage media, to display the first snapshot of the complete graphical user interface; and
program instructions, stored on the one or more computer readable storage media, to overlay the second snapshot over the first snapshot at the determined location, in order to generate a current image for the subsequent test step, N+1.

17. The computer system of claim 16, further comprising:
program instructions, stored on the one or more computer readable storage media, to indicate on the display of the first snapshot, the determined location.

18. The computer system of claim 15, wherein the program instructions to determine the information detailing the location and geometry of the at least one graphical user interface comprises:
program instructions to generate an event listener, wherein the event listener receives an event message when a pre-event action occurs;
program instructions to, in response to receiving an event message, detect, by the event listener, the at least one graphical user interface control which is being interacted with by the pre-event action; and
program instructions to determine the location of the at least one graphical user interface control based at least in part on application code associated with the graphical user interface.

19. The computer system of claim 15, further comprising:
program instructions, stored on the one or more computer readable storage media, to determine that a second test step instructs the graphical user interface to reload the complete graphical user interface;
program instructions, stored on the one or more computer readable storage media, to capture a third snapshot, wherein the third snapshot is of the complete graphical user interface;
program instructions, stored on the one or more computer readable storage media, to overlay the third snapshot over the second snapshot at the determined location of the at least one graphical user interface control within the complete graphical user interface, wherein the resulting image is the expected image for a second test step N and the current image for a third test step, N+1, where N is equal to 2.

20. The computer system of claim 15, wherein the test step comprises detecting a pre-event action, wherein the pre-event action comprises an event which occurs directly prior to the alteration of the at least one graphical user interface control; and detecting a post-event action, wherein the post-event action comprises a second event which occurs directly after the alteration to the at least one graphical user interface control and concludes the test step, and wherein an event listener detects the pre-event action and the post-event action, and wherein the pre-event action comprises at least one of: down clicking a mouse button, pressing a key on a keyboard, and placing a finger on a touch screen, and the post-event action comprises at least one of: up clicking a mouse button, releasing a key on a keyboard, and removing a finger from a touch screen.

* * * * *